United States Patent
Mugiuda et al.

(10) Patent No.: US 9,188,671 B2
(45) Date of Patent: Nov. 17, 2015

(54) MOVING BODY DETECTOR

(71) Applicant: PANASONIC CORPORATION, Osaka (JP)

(72) Inventors: Toru Mugiuda, Mie (JP); Fumihiro Kasano, Osaka (JP); Hidehiko Fujikawa, Mie (JP); Yutaka Abe, Mie (JP); Toshimasa Takagi, Mie (JP); Kazushi Goto, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 45 days.

(21) Appl. No.: 14/347,574

(22) PCT Filed: Sep. 24, 2012

(86) PCT No.: PCT/JP2012/074321
§ 371 (c)(1),
(2) Date: Mar. 26, 2014

(87) PCT Pub. No.: WO2013/051408
PCT Pub. Date: Apr. 11, 2013

(65) Prior Publication Data
US 2014/0241125 A1    Aug. 28, 2014

(30) Foreign Application Priority Data
Oct. 4, 2011  (JP) .................. 2011-219786

(51) Int. Cl.
G08B 29/16  (2006.01)
G01S 15/52  (2006.01)
G01S 7/52  (2006.01)
G01S 13/56  (2006.01)
G08B 13/16  (2006.01)
G01S 7/40  (2006.01)

(52) U.S. Cl.
CPC .......... *G01S 15/523* (2013.01); *G01S 7/52004* (2013.01); *G01S 7/4004* (2013.01); *G01S 13/56* (2013.01); *G08B 13/1627* (2013.01)

(58) Field of Classification Search
CPC .... G08B 29/16; G08B 17/00; G08B 13/1627; G01S 15/523
USPC .............. 367/90, 94; 340/435, 438, 540, 541, 340/545.5, 552, 554
See application file for complete search history.

(56) References Cited

U.S. PATENT DOCUMENTS

| 7,746,220 B2 * | 6/2010 | Takagi et al. ................. 340/435 |
| 8,218,395 B2 * | 7/2012 | Kasano et al. ................. 367/90 |
| 2005/0219117 A1 | 10/2005 | Hiromori et al. |

FOREIGN PATENT DOCUMENTS

| EP | 0 825 455 A2 | 2/1998 |
| JP | 58-135475 A | 8/1983 |
| JP | 2005-017290 A | 1/2005 |
| JP | 2009-281890 A | 12/2009 |

OTHER PUBLICATIONS

International Search Report issued in International Application No. PCT/JP2012/074321 with Date of mailing Oct. 23, 2012, with English Translation.

* cited by examiner

*Primary Examiner* — Tai T Nguyen
(74) *Attorney, Agent, or Firm* — McDermott Will & Emery LLP

(57) ABSTRACT

In a malfunction detection mode, a controller is configured to compare an output of a phase-detector obtained when controlling to input an oscillation signal to only the phase-detector, with an output of the phase-detector obtained when controlling to input the oscillation signal to both of a transmitter and the phase-detector. If a change (difference) of signal levels of the outputs is equal to or more than a prescribed threshold, the controller determines that there is no malfunction in the transmitter and a receiver. If the change of the signal levels is less than the prescribed threshold, the controller determines that there is a malfunction in the transmitter or the receiver.

18 Claims, 3 Drawing Sheets

MOVING BODY DETECTOR

RELATED APPLICATIONS

This application is the U.S. National Phase under 35 U.S.C. §371 of International Application No. PCT/JP2012/074321, filed on Sep. 24, 2012, which in turn claims the benefit of Japanese Application No. 2011-219786, filed on Oct. 4, 2011, the disclosures of which Applications are incorporated by reference herein.

TECHNICAL FIELD

The invention relates generally to moving body detectors and, more particularly, to a moving body detector that transmits, to a space to be monitored, continuous energy waves, such as ultrasonic waves or radio waves, and detects a frequency shift of a reflected wave generated due to movement of an object within the space to be monitored, thereby detecting presence of the object moving within the space to be monitored.

BACKGROUND ART

Conventionally, there has been a moving body detector described in Japanese Published Unexamined Patent Application No. 2009-281890. The conventional moving body detector in the above-mentioned document, as shown in FIG. 2, includes a first oscillation circuit 1a, a second oscillation circuit 1b, a frequency selection circuit 2, a transmitter 3, a receiver 4, a phase detection circuit 5, a low pass filter 6, a comparator 7, an operational circuit 8a, a threshold circuit 8b, and a control circuit 9. The first oscillation circuit 1a is configured to oscillate a transmission signal having a frequency fa, and the second oscillation circuit 1b is configured to oscillate a reference signal having a frequency fb that is different from the frequency of the transmission signal. The transmitter 3 is configured to transmit ultrasonic waves to a space to be monitored, when receiving the transmission signal outputted from the first oscillation circuit 1a. The receiver 4 is configured to output a receiving signal, when receiving a reflected wave generated due to reflection of the ultrasonic waves by an object (a moving body) 50 that exists within the space to be monitored. The phase detection circuit 5 is configured to mix the receiving signal and any one of the transmission signal and the reference signal, to obtain a Doppler signal according to a frequency difference between the receiving signal and the any one. The frequency selection circuit 2 is configured to switch the transmission signal and the reference signal inputted to the phase detection circuit 5. The low pass filter 6 is configured to remove unnecessary high frequency components from the Doppler signal outputted from the phase detection circuit 5. The comparator 7 is configured to compare the Doppler signal outputted from the low pass filter 6, with a predetermined reference value, to convert into a binary signal. The operational circuit 8a is configured to perform an operational processing of the binary signal outputted from the comparator 7. The threshold circuit 8b is configured to detect the moving body 50 within the space to be monitored, based on an operation result by the operational circuit 8a, to output a detection signal. The control circuit 9 is configured to have a moving body detection mode of detecting the moving body 50 and a malfunction detection mode of detecting whether or not the detector is normally operating. In the moving body detection mode, the control circuit 9 is configured to control the frequency selection circuit 2 to input the transmission signal to the phase detection circuit 5. In the malfunction detection mode, the control circuit 9 is configured to control the frequency selection circuit 2 to input the reference signal to the phase detection circuit 5.

In the case where the control circuit 9 operates in the moving body detection mode, the transmitter 3 transmits, to the space to be monitored, the ultrasonic waves having the same frequency as the transmission signal, when receiving the transmission signal having the frequency fa from the first oscillation circuit 1a. Then, the receiver 4 receives the reflected wave having a frequency f'a generated due to reflection of the ultrasonic waves by the moving body 50 that exists within the space to be monitored and then outputs, to the phase detection circuit 5, the receiving signal having the same frequency as the reflected wave. The phase detection circuit 5 mixes the receiving signal, and the transmission signal that is outputted from the first oscillation circuit 1a via the frequency selection circuit 2, and then outputs the Doppler signal according to the frequency difference between those signals. Then, the low pass filter 6 removes unnecessary high frequency components from the Doppler signal outputted from the phase detection circuit 5, and then the comparator 7 converts the Doppler signal into the binary signal to output to the operational circuit 8a. The operational circuit 8a performs the operational processing of the binary signal to obtain a moving speed of the moving body 50. Then, when the obtained moving speed exceeds a prescribed value, the threshold circuit 8b determines that the moving body 50 exists within the space to be monitored, and then outputs the detection signal.

Here, when, in the moving body detection mode, the moving body 50 does not exist within the space to be monitored or remains stationary within the space to be monitored, the frequencies of the receiving signal and the transmission signal mixed by the phase detection circuit 5 are equal to each other, and accordingly, it is impossible to obtain the Doppler signal. So, in the conventional moving body detector, to detect whether or not the detector is normally operating, the control circuit 9 operates in the malfunction detection mode and controls the frequency selection circuit 2 to input, to the phase detection circuit 5, the reference signal having the frequency fb that is different from that of the transmission signal. Accordingly, the phase detection circuit 5 mixes the signals having the frequencies different from each other, thereby obtaining a pseudo Doppler signal. Therefore, it is possible to detect whether or not the detector is normally operating, through comparing a result of an operational processing of the pseudo Doppler signal performed by the operational circuit 8a, with a predetermined threshold. That is, it is possible to determine that the detector is normally operating when the result of the operational processing of the pseudo Doppler signal agrees with the predetermined threshold, and that there is a malfunction such as disconnection in any of circuits constituting the detector when the result thereof disagree with the predetermined threshold.

In this conventional moving body detector, the first oscillation circuit 1a, second oscillation circuit 1b, frequency selection circuit 2, operational circuit 8a, threshold circuit 8b and control circuit 9 are configured by a microcomputer. The microcomputer executes a program, thereby achieving the functions of the above-mentioned circuits. Therefore, it is possible to realize the first oscillation circuit 1a, second oscillation circuit 1b and frequency selection circuit 2 through utilizing a timer function provided in the microcomputer, and realize the above-mentioned malfunction detection function with only changing software without seriously changing hardware.

However, it is required that the conventional moving body detector includes two oscillation circuits 1a, 1b, of which the oscillation frequencies are different from each other, in order to realize the malfunction detection function. In addition, if the oscillation circuits 1a, 1b and the like are configured by the microcomputer, two of plural timers in the microcomputer may be occupied to output two signals (the transmission signal and reference signal) of which the frequencies are different from each other.

As explained above, because the conventional moving body detector requires a plurality of pieces of hardware (the oscillation circuits 1a and 1b, or two or more timers of microcomputer) having the same functions, there is a possibility that the cost or the size of the detector is increased with addition of the malfunction detection function.

DISCLOSURE OF THE INVENTION

It is an object of the present invention to provide a moving body detector, which can achieve addition of a malfunction detection function, while suppressing increase in the cost or the size.

A moving body detector of the present invention includes: an oscillator configured to output an oscillation signal having a prescribed frequency; a transmitter configured to transmit, to a space to be monitored, continuous energy waves of which amplitude is periodically changed according to the oscillation signal outputted from the oscillator; a receiver configured to output a receiving signal, when receiving a reflected wave generated due to reflection of the continuous energy waves by an object that exists within the space to be monitored; a phase-detector configured to mix the oscillation signal and the receiving signal to obtain a Doppler signal according to a frequency difference between the oscillation signal and the receiving signal; a detector configured to detect a moving body within the space to be monitored, by processing the Doppler signal, to output a detection signal; and a controller configured to control the oscillator, transmitter, receiver, phase-detector and detector, and alternatively switch a moving body detection mode of detecting the moving body and a malfunction detection mode of detecting presence or absence of malfunction occurrence. In the moving body detection mode, the controller is configured to control to input the oscillation signal to the transmitter and the phase-detector, and make the phase-detector output the Doppler signal according to the frequency difference between the oscillation signal and the receiving signal. In the malfunction detection mode, the controller is configured to compare an output of the phase-detector obtained when controlling to input the oscillation signal to only the phase-detector, with an output of the phase-detector obtained when controlling to input the oscillation signal to both of the transmitter and the phase-detector, to detect the presence or absence of the malfunction occurrence.

According to this configuration, it is possible to achieve addition of a malfunction detection function, while suppressing increase in the cost or the size.

In the moving body detector, preferably, in the malfunction detection mode, the controller is configured to compare the output of the phase-detector obtained when controlling to input the oscillation signal to only the phase-detector, with an output of the phase-detector obtained after shifting from a state of inputting the oscillation signal to only the phase-detector to a state of inputting the oscillation signal also to the transmitter in addition to the phase-detector, to detect the presence or absence of the malfunction occurrence.

In the moving body detector, preferably, in the malfunction detection mode, the controller is configured to compare the output of the phase-detector obtained when controlling to input the oscillation signal to both of the transmitter and the phase-detector, with an output of the phase-detector obtained after shifting from a state of inputting the oscillation signal to both of the transmitter and the phase-detector to a state of inputting the oscillation signal to only the phase-detector through stopping inputting the oscillation signal to the transmitter, to detect the presence or absence of the malfunction occurrence.

In the moving body detector, preferably, the phase-detector includes: a first phase detection block configured to mix the oscillation signal and the receiving signal to obtain the Doppler signal according to the frequency difference between the oscillation signal and the receiving signal; and a second phase detection block configured to mix the receiving signal and a second oscillation signal obtained by shifting a phase of the oscillation signal through a phase shifter, to obtain a Doppler signal according to a frequency difference between the receiving signal and the second oscillation signal.

In the moving body detector, preferably, the phase shifter is configured to shift the phase so that a phase difference between the oscillation signal and the second oscillation signal agrees with substantially $\pi/2$.

In the moving body detector, preferably, in the malfunction detection mode, the controller is configured to calculate a sum of a square of an output of the first phase detection block and a square of an output of the second phase detection block, and compare results relating to the sum to detect the presence or absence of the malfunction occurrence.

In the moving body detector, preferably, in the malfunction detection mode, the controller is configured to compare the output of the phase-detector obtained when controlling to input the oscillation signal to only the phase-detector, with an output of the phase-detector obtained when controlling to input neither the oscillation signal nor the receiving signal to the phase-detector, to detect the presence or absence of the malfunction occurrence in the phase-detector.

In the moving body detector, preferably, the oscillator is configured by a microcomputer that is provided with a timer, and is configured to oscillate the oscillation signal with the timer.

In the moving body detector, preferably, the controller is configured to perform a processing of detecting malfunction in the malfunction detection mode before switching to the moving body detection mode.

BRIEF DESCRIPTION OF THE DRAWINGS

Preferred embodiments of the invention will now be described in further details. Other features and advantages of the present invention will become better understood with regard to the following detailed description and accompanying drawings where.

BEST MODE FOR CARRYING OUT THE INVENTION

Figure 1A:
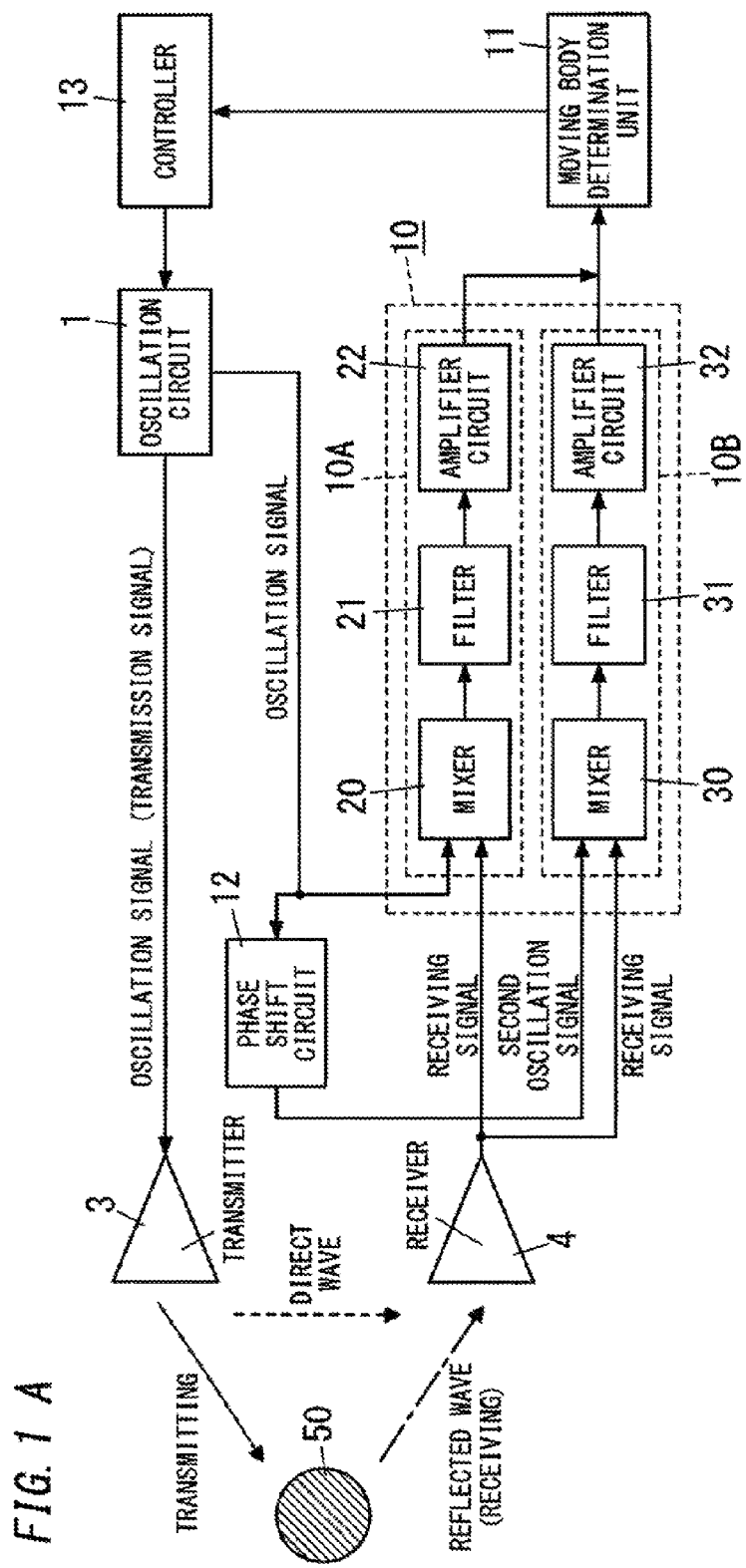
FIG. 1A is a block diagram illustrating a moving body detector according to an embodiment of the present invention.
Figure 1:
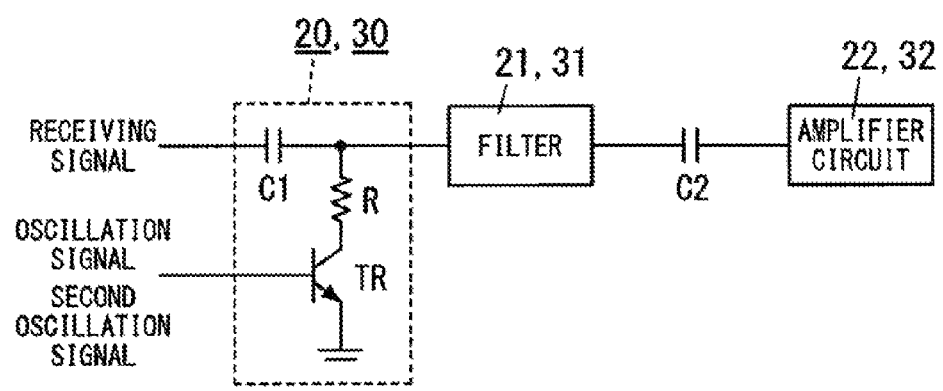
FIG. 1B is a circuit diagram illustrating a mixer of the moving body detector according to the embodiment of the present invention.
Figure 2:
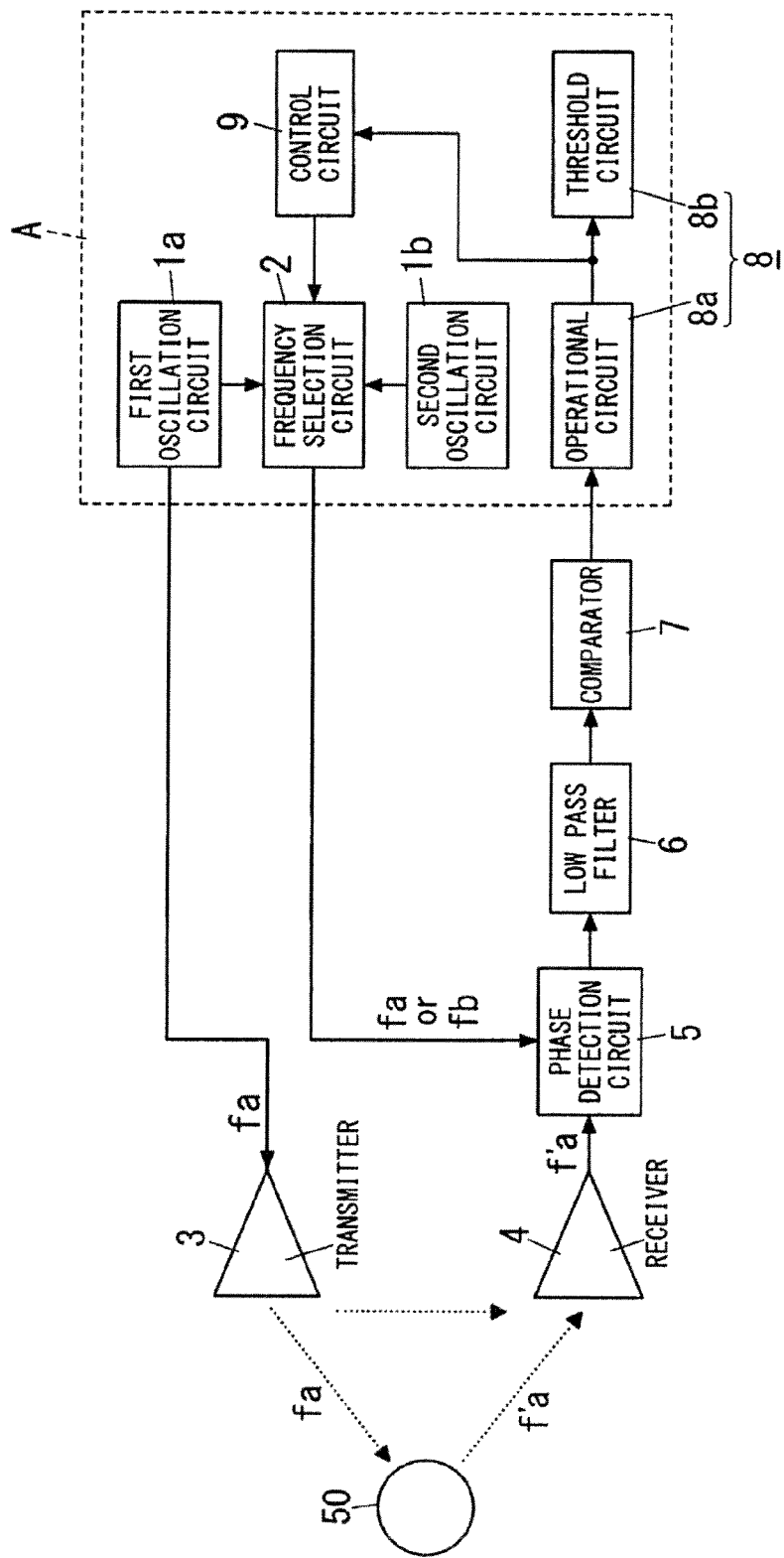
FIG. 2 is a block diagram illustrating a conventional moving body detector.

An embodiment of a moving body detector according to the present invention will be described below in detail, referring to the drawings. In the present embodiment, ultrasonic waves are transmitted as continuous energy waves, similarly to a conventional moving body detector. However, technical ideas of the present invention can be applied also in a case where radio waves are transmitted instead of the ultrasonic waves. Configuration elements having functions similar to the conventional moving body detector are assigned with same reference numerals, and explanations thereof will be omitted appropriately.

As shown in FIG. 1A, the moving body detector of the present embodiment includes an oscillation circuit 1 (an oscillator), a transmitter 3, a receiver 4, a phase-detector 10, a moving body determination unit 11 (a detector), a phase shift circuit 12 (a phase shifter), and a controller 13. The oscillation circuit 1 is configured to be capable of outputting an oscillation signal having a frequency of several tens of kilohertz via each of two output terminals separately. The transmitter 3 is configured to transmit, to a space to be monitored, ultrasonic waves having the same frequency (several tens of kilohertz) as the oscillation signal, when receiving the oscillation signal outputted from one of the two output terminals of the oscillation circuit 1. When receiving the ultrasonic waves coming from the space to be monitored, the receiver 4 is configured to convert the ultrasonic waves into an electrical signal (a receiving signal) to output the converted receiving signal to the phase-detector 10. The phase shift circuit 12 is configured to shift a phase of the oscillation signal, outputted from the other of the two output terminals of the oscillation circuit 1, by $\pi/2$. Hereinafter, the oscillation signal in which the phase is shifted by the phase shift circuit 12 is referred as to a second oscillation signal.

The phase-detector 10 includes a first phase detection block 10A and a second phase detection block 10B. The first phase detection block 10A includes a mixer 20, a filter 21 and an amplifier circuit 22. The second phase detection block 10B includes a mixer 30, a filter 31 and an amplifier circuit 32. The mixer 20 is configured to mix (multiply) the oscillation signal and the receiving signal to output components (signals) of a frequency difference between the two signals, and a sum of frequencies of the two signals. Similarly, the mixer 30 is configured to mix (multiply) the second oscillation signal and the receiving signal to output components (signals) of a frequency difference between the two signals, and a sum of frequencies of the two signals. Each of the mixers 20, 30 includes: a capacitor C1 that cuts a direct current component from the receiving signal; and an NPN bipolar transistor TR in which a collector is connected to an output side of the capacitor C1 via a resistor R and an emitter is grounded, as shown in FIG. 1B for example. When the oscillation signal (or the second oscillation signal) is inputted to a base of the bipolar transistor TR, the mixed two kinds of signals (the component of the frequency difference and the component of the sum of the frequencies) are outputted from a connection point between the resistor R and capacitor C1.

The filter 21 includes a low pass filter, and is configured to allow, from among the two kinds of signals outputted from the mixer 20, only the signal (Doppler signal) of the component of the frequency difference between the oscillation signal and the receiving signal to pass through. Similarly, the filter 31 includes a low pass filter, and is configured to allow, from among the two kinds of signals outputted from the mixer 30, only the signal (Doppler signal) of the component of the frequency difference between the second oscillation signal and the receiving signal to pass through. The amplifier circuits 22, 32 are configured to amplify the Doppler signals passing through the filters 21, 31, respectively. Although not illustrated in FIG. 1A, a capacitor C2 for cutting a direct current is inserted between the filter 21 and amplifier circuit 22, and similarly a capacitor C2 is inserted between the filter 31 and amplifier circuit 32.

The moving body determination unit 11 is configured to determine (detect) that a moving body 50 exists within the space to be monitored and output a detection signal, when determining that signal levels of the Doppler signals amplified by the amplifier circuits 22, 32 correspond to movement components. The detection signal from the moving body determination unit 11 is transmitted to, for example, an ECU (Electronic Control Unit) of a vehicle, and the ECU notifies the surroundings of intrusion of a suspicious person into the vehicle, through issuing alarm sounds (horn sounds) for example.

The controller 13 is configured to control the oscillator circuit, transmitter, receiver, phase-detector, phase shift circuit and moving body determination unit, and alternatively switch a moving body detection mode of detecting the moving body and a malfunction detection mode of detecting presence or absence of malfunction occurrence. In the moving body detection mode, the controller 13 is configured to make the oscillator circuit 1 input the oscillation signal to the transmitter 3 and phase-detector 10, to make the moving body determination unit 11 detect the moving body based on the Doppler signal outputted from the phase-detector 10.

Here, the receiver 4 may receive an ultrasonic wave (reflected wave) reflected by a stationary object, such as a windowpane or a door, in a closed space as in the vehicle. Further, the receiver 4 may receive directly a part of the ultrasonic waves outputted from the transmitter 3. If no moving body exists within the space to be monitored, a frequency of the receiving signal agrees with that of the oscillation signal (transmission signal), and the component of the frequency difference between the oscillation signal (or the second oscillation signal) and the receiving signal becomes zero. Therefore, the filer 21 (or filter 31) outputs only a signal of a direct current component according to a phase difference between the oscillation signal (or the second oscillation signal) and the receiving signal. That is, in a case where at least one of the transmitter 3 and receiver 4 fails and does not operate, the signal outputted from the mixer 20 (or mixer 30) becomes a direct current signal having a level according to only a phase of the oscillation signal (or the second oscillation signal). This direct current signal is not required in the moving body detection mode, and accordingly is cut with the capacitor C2. On the other hand, when the level of the signal outputted from each of the filers 21, 31 is changed with a change of the phase difference between the signals inputted to each of the mixers 20, 30, a signal according to the level change is outputted from each of the amplifier circuit 22, 32.

Therefore, it is possible to detect presence or absence of malfunction occurrence, through comparing an output of the phase-detector 10 obtained when controlling to input the oscillation signal to only the phase-detector 10, with an output of the phase-detector 10 obtained when controlling to input the oscillation signal to both of the transmitter 3 and the phase-detector 10.

So, in the malfunction detection mode, the controller 13 first acquires the output of the phase-detector 10 obtained when controlling to input the oscillation signal to only the phase-detector 10, from the moving body determination unit 11. Further, after the output change of the phase-detector 10 is reduced, the controller 13 acquires the output of the phase-detector 10 obtained when controlling to input the oscillation signal to both of the transmitter 3 and the phase-detector 10, from the moving body determination unit 11, and compares a signal level of the former output with that of the latter output.

That is, the controller 13 is configured to compare the output of the phase-detector 10 obtained when controlling to input the oscillation signal to only the phase-detector 10, with an output of the phase-detector 10 obtained after shifting from a state of inputting the oscillation signal to only the phase-detector 10 to a state of inputting the oscillation signal also to the transmitter 3 in addition to the phase-detector 10.

Then, if a change (difference) of the signal level is equal to or more than a prescribed threshold, the controller determines that there is no malfunction in the transmitter 3 and the receiver 4. If the change of the signal level is less than the prescribed threshold, the controller determines that there is a malfunction in the transmitter 3 or the receiver 4. Alternatively, the controller 13 may be configured to compare the output of the phase-detector 10 obtained when controlling to input the oscillation signal to both of the transmitter 3 and the phase-detector 10, with an output of the phase-detector 10 obtained when controlling to input the oscillation signal to only the phase-detector 10 through stopping inputting the oscillation signal to the transmitter 3. The controller 13 is configured to output a malfunction detection signal to an external device (e.g., an ECU or the like of a vehicle) when determining that there is a malfunction.

As described above, unlike the conventional moving body detector, the moving body detector of the present embodiment can detect the presence or absence of the malfunction occurrence with only one kind of the oscillation signal, and accordingly can achieve addition of a malfunction detection function, while suppressing increase in the cost or the size. Furthermore, in the present embodiment, the phase difference of $\pi/2$ is set between the oscillation signal and the second oscillation signal, and accordingly, even when a phase difference between the oscillation and receiving signals inputted to one of the first and second phase detection blocks becomes zero, a phase difference between the oscillation and receiving signals inputted to the other does not become zero. Therefore, the moving body detector can securely detect the malfunction occurrence. As the phase difference between the oscillation signal and the second oscillation signal, setting $\pi/2$ is not required, but it is possible to securely detect the malfunction occurrence by setting $\pi/2$, even when the number of the phase detection blocks is minimum (that is, two).

Here, in the malfunction detection mode, the controller 13 may be configured to compare the output of the phase-detector 10 obtained when controlling to previously drive the transmitter 3 and the receiver 4 and input the oscillation signal to both of the transmitter 3 and the phase-detector 10, with an output of the phase-detector 10 obtained after shifting from a state of inputting the oscillation signal to both of the transmitter 3 and the phase-detector 10 to a state of inputting the oscillation signal to only the phase-detector 10 through stopping inputting the oscillation signal to the transmitter 3, to detect the presence or absence of the malfunction occurrence.

Also, the moving body detector can detect the presence or absence of the malfunction occurrence with only an output of any one of the first phase detection block 10A and the second phase detection block 10B. Here, the moving body detector can detect the presence or absence of the malfunction occurrence more securely, in a case where in the malfunction detection mode the controller is configured to calculate a sum of a square of an output of the first phase detection block and a square of an output of the second phase detection block, and compare results relating to the sum. Specifically, the controller may be configured to calculate a sum of a square of an output of the first phase detection block 10A and a square of an output of the second phase detection block 10B, obtained when controlling to input the oscillation signal to only the phase-detector 10, and further calculate a sum of a square of an output of the first phase detection block 10A and a square of an output of the second phase detection block 10B, obtained when controlling to input the oscillation signal to both of the transmitter 3 and the phase-detector 10, and compare the two sums with each other to detect the presence or absence of the malfunction occurrence.

Here, in the malfunction detection mode, the controller 13 may be configured to compare the output of the phase-detector 10 obtained when controlling to input the oscillation signal to only the phase-detector 10, with an output of the phase-detector 10 obtained when controlling to input neither the oscillation signal nor the receiving signal to the phase-detector 10. That is, in a state where no receiving signal is inputted, when the oscillation signal (or the second oscillation signal) is inputted to the base of the bipolar transistor TR in the mixer 20 (or mixer 30), a level of a direct current voltage outputted from the mixer 20 (or mixer 30) is changed according to the oscillation signal. Therefore, the controller 13 compares the output of the phase-detector 10 obtained when only the oscillation signal is inputted to the phase-detector 10, with the output thereof obtained when no oscillation signal is inputted thereto, while no receiving signal is inputted, and accordingly, the moving body detector can detect the presence or absence of the malfunction occurrence (failure) in the phase-detector 10.

Preferably, the controller 13 is configured to perform a processing of detecting malfunction in the malfunction detection mode before switching to the moving body detection mode. That is, because the moving body detector of the present embodiment is intended to detect the moving body in a vehicle during parking, after a driver parks and leaves the vehicle, the controller performs the processing of detecting malfunction in the malfunction detection mode before performing a processing of detecting the moving body in the moving body detection mode. Therefore, the moving body detector can reduce detection mistake of the moving body.

In the present embodiment, the oscillation circuit 1, phase-detector 10, moving body determination unit 11, phase shift circuit 12 and controller 13 may be configured by a microcomputer, similarly to the case of the conventional moving body detector. The microcomputer executes a prescribed program, thereby achieving each function. That is, it is possible to oscillate the oscillation signal with a timer that is provided in the microcomputer. Further, plural timers are not occupied when oscillating the oscillation signal, unlike the conventional moving body detector. In the conventional moving body detector, there is a case where it is required to change an existing microcomputer to another microcomputer in which the number of the timers is larger, to detect the presence or absence of the malfunction occurrence. On the other hand, in the present embodiment, there is a high possibility that the moving body detector can detect the presence or absence of the malfunction occurrence without changing an existing microcomputer.

Although the present invention has been described with reference to certain preferred embodiments, numerous modifications and variations can be made by those skilled in the art without departing from the true spirit and scope of this invention, namely claims.

The invention claimed is:
1. A moving body detector, comprising:
an oscillator configured to output an oscillation signal having a prescribed frequency;
a transmitter configured to transmit, to a space to be monitored, continuous energy waves of which amplitude is periodically changed according to the oscillation signal outputted from the oscillator;

a receiver configured to output a receiving signal, when receiving a reflected wave generated due to reflection of the continuous energy waves by an object that exists within the space to be monitored;

a phase-detector configured to mix the oscillation signal and the receiving signal to obtain a Doppler signal according to a frequency difference between the oscillation signal and the receiving signal;

a detector configured to detect a moving body within the space to be monitored, by processing the Doppler signal, to output a detection signal; and a controller configured to control the oscillator, transmitter, receiver, phase-detector and detector, and alternatively switch a moving body detection mode of detecting the moving body and a malfunction detection mode of detecting presence or absence of malfunction occurrence, wherein, in the moving body detection mode, the controller is configured to control to input the oscillation signal to the transmitter and the phase-detector, and make the phase-detector output the Doppler signal according to the frequency difference between the oscillation signal and the receiving signal, and wherein, in the malfunction detection mode, the controller is configured to compare an output of the phase-detector obtained when controlling to input the oscillation signal to only the phase-detector, with an output of the phase-detector obtained when controlling to input the oscillation signal to both of the transmitter and the phase-detector, to detect the presence or absence of the malfunction occurrence.

2. The moving body detector according to claim 1, wherein, in the malfunction detection mode, the controller is configured to compare the output of the phase-detector obtained when controlling to input the oscillation signal to only the phase-detector, with an output of the phase-detector obtained after shifting from a state of inputting the oscillation signal to only the phase-detector to a state of inputting the oscillation signal also to the transmitter in addition to the phase-detector, to detect the presence or absence of the malfunction occurrence.

3. The moving body detector according to claim 2, wherein the phase-detector comprises:

a first phase detection block configured to mix the oscillation signal and the receiving signal to obtain the Doppler signal according to the frequency difference between the oscillation signal and the receiving signal; and a second phase detection block configured to mix the receiving signal and a second oscillation signal obtained by shifting a phase of the oscillation signal through a phase shifter, to obtain a Doppler signal according to a frequency difference between the receiving signal and the second oscillation signal.

4. The moving body detector according to claim 3, wherein the phase shifter is configured to shift the phase so that a phase difference between the oscillation signal and the second oscillation signal agrees with substantially $\pi/2$.

5. The moving body detector according to claim 4, wherein, in the malfunction detection mode, the controller is configured to calculate a sum of a square of an output of the first phase detection block and a square of an output of the second phase detection block, and compare results relating to the sum to detect the presence or absence of the malfunction occurrence.

6. The moving body detector according to claim 3, wherein, in the malfunction detection mode, the controller is configured to calculate a sum of a square of an output of the first phase detection block and a square of an output of the second phase detection block, and compare results relating to the sum to detect the presence or absence of the malfunction occurrence.

7. The moving body detector according to claim 1, wherein, in the malfunction detection mode, the controller is configured to compare the output of the phase-detector obtained when controlling to input the oscillation signal to both of the transmitter and the phase-detector, with an output of the phase-detector obtained after shifting from a state of inputting the oscillation signal to both of the transmitter and the phase-detector to a state of inputting the oscillation signal to only the phase-detector through stopping inputting the oscillation signal to the transmitter, to detect the presence or absence of the malfunction occurrence.

8. The moving body detector according to claim 7, wherein the phase-detector comprises:

a first phase detection block configured to mix the oscillation signal and the receiving signal to obtain the Doppler signal according to the frequency difference between the oscillation signal and the receiving signal; and a second phase detection block configured to mix the receiving signal and a second oscillation signal obtained by shifting a phase of the oscillation signal through a phase shifter, to obtain a Doppler signal according to a frequency difference between the receiving signal and the second oscillation signal.

9. The moving body detector according to claim 4, wherein the phase shifter is configured to shift the phase so that a phase difference between the oscillation signal and the second oscillation signal agrees with substantially $\pi/2$.

10. The moving body detector according to claim 9, wherein, in the malfunction detection mode, the controller is configured to calculate a sum of a square of an output of the first phase detection block and a square of an output of the second phase detection block, and compare results relating to the sum to detect the presence or absence of the malfunction occurrence.

11. The moving body detector according to claim 4, wherein, in the malfunction detection mode, the controller is configured to calculate a sum of a square of an output of the first phase detection block and a square of an output of the second phase detection block, and compare results relating to the sum to detect the presence or absence of the malfunction occurrence.

12. The moving body detector according to claim 1, wherein the phase-detector comprises:

a first phase detection block configured to mix the oscillation signal and the receiving signal to obtain the Doppler signal according to the frequency difference between the oscillation signal and the receiving signal; and a second phase detection block configured to mix the receiving signal and a second oscillation signal obtained by shifting a phase of the oscillation signal through a phase shifter, to obtain a Doppler signal according to a frequency difference between the receiving signal and the second oscillation signal.

13. The moving body detector according to claim 12, wherein the phase shifter is configured to shift the phase so that a phase difference between the oscillation signal and the second oscillation signal agrees with substantially $\pi/2$.

14. The moving body detector according to claim 13, wherein, in the malfunction detection mode, the controller is configured to calculate a sum of a square of an output of the first phase detection block and a square of an output of the second phase detection block, and compare results relating to the sum to detect the presence or absence of the malfunction occurrence.

15. The moving body detector according to claim 12, wherein, in the malfunction detection mode, the controller is configured to calculate a sum of a square of an output of the first phase detection block and a square of an output of the second phase detection block, and compare results relating to the sum to detect the presence or absence of the malfunction occurrence.

16. The moving body detector according to claim 1, wherein, in the malfunction detection mode, the controller is configured to compare the output of the phase-detector obtained when controlling to input the oscillation signal to only the phase-detector, with an output of the phase-detector obtained when controlling to input neither the oscillation signal nor the receiving signal to the phase-detector, to detect the presence or absence of the malfunction occurrence in the phase-detector.

17. The moving body detector according to claim 1, wherein the oscillator is configured by a microcomputer that is provided with a timer, and is configured to oscillate the oscillation signal with the timer.

18. The moving body detector according to claim 1, wherein the controller is configured to perform a processing of detecting malfunction in the malfunction detection mode before switching to the moving body detection mode.

* * * * *